United States Patent [19]
Arai et al.

[11] Patent Number: 4,486,217
[45] Date of Patent: Dec. 4, 1984

[54] COMPOUND SOLID FERTILIZER AND MANUFACTURING METHOD THEREOF

[75] Inventors: Taiji Arai, Abiko; Saburo Kako, Yokohama, both of Japan

[73] Assignees: Denryoku-Chuo-Kenkyusho; Shigen-Kyokai, both of Tokyo, Japan

[21] Appl. No.: 379,083

[22] Filed: May 17, 1982

[30] Foreign Application Priority Data

May 22, 1981 [JP] Japan .................................. 56-77858
May 22, 1981 [JP] Japan .................................. 56-77859
May 22, 1981 [JP] Japan .................................. 56-77860

[51] Int. Cl.$^3$ ............................................. C05G 1/00
[52] U.S. Cl. ........................................ 71/25; 71/35; 71/37; 71/62; 71/64.13
[58] Field of Search ............... 71/25, 31, 35, 37, 64.13

[56] References Cited

FOREIGN PATENT DOCUMENTS 0038366  3/1977  Japan .................................. 71/25
0105057  8/1979  Japan .................................. 71/25
0140099  11/1981 Japan .................................. 71/25

Primary Examiner—Ferris H. Lander
Attorney, Agent, or Firm—Robert E. Burns; Emmanuel J. Lobato; Bruce L. Adams

[57] ABSTRACT

A method for manufacturing a compound solid fertilizer is disclosed in which, inexpensive chlorides such as potassium chloride, ammonium chloride and so forth are used as supplementary fertilizer components to be admixed with a phosphate or silicophosphate gel-sol mixture prepared by mixing phosphoric acid with the aforementioned inorganic compound minerals consisting principally of iron, aluminum, magnesium and others. During granulation and hardening, resultant combined chlorine is separated and recovered in the form of hydrochloric acid to minimize the chlorine radical content, thereby permitting not only the manufacture of a fertilizer with practically no bad effect on soil but also the fabrication of hydrochloric acid. Concentrated phosphoric acid, such as super phosphoric acid or concentrated phosphate can be used as the phosphoric acid. A slow-working fertilizer raw material can be further mixed with the gel-sol mixture.

19 Claims, 3 Drawing Figures

COMPOUND SOLID FERTILIZER AND MANUFACTURING METHOD THEREOF

BACKGROUND OF THE INVENTION

The present invention relates to a compound solid fertilizer which makes effective use of artificial or natural inorganic compound mineral matter of little utility value consisting principally of iron, aluminum, magnesium, silica and so forth, or unused organic matter, and a manufacturing method thereof.

Artificial inorganic compound minerals consisting principally of iron, aluminum, calcium, magnesium, potash and so on are, for instance, coal ash discharged from coal thermal power plants and various slag from iron mills, and inorganic compound minerals existing in nature are, for example, serpentine, peridotitite, potash feldspar, magnesium salt, calcium salt, etc. Because of their small contents of useful components, however, these inorganic compound minerals are mostly unused; for example, some of the coal ash and slag are merely utilized as a raw material of cement concrete or artificial aggregate for civil engineering and construction, and they are almost discarded. As a result, great difficulties are now being encountered in finding a dumping ground for such industrial waste. The same is true of various animal and vegetable organics which are discharged from urban agricultural and marine products industries. So, a proposal has recently been made of utilizing such untouched resources as inexpensive complex fertilizers to overcome the abovesaid difficulties in the mining and manufacturing industries, the agricultural and forestry industries and the marine products industry and, at the same time, to prevent effusion of fertilizer and hence reduce farm prices, thereby bringing profits to both the mining and manufacturing industries and the agricultural industry. Moreover, some complex fertilizers based on such a proposal, including those by the present inventor, have already been put to practical use. Since fabrication of such conventional fertilizers involves a firing process which requires much thermal energy it is contrary to what is called a resources-saving principle and inevitably becomes costly and hence is still unsatisfactory.

In view of the above defects, the present inventors have made various studies and, as a result of our studies, have proposed complex fertilizers characterized by the following wet manufacturing method which does not call for such heat treatment as firing (see Japanese Pat. Applns. Nos. 106753/80 and 106754/80). With this method, by adding a phosphoric acid mixture soluton to such inorganic compound minerals as mentioned previously or their mixture with an organic substance, even a substance extremely stable in a natural environment readily decomposes to form a gel-sol mixture of phosphate or silicophosphate. Moreover, supplementary fertilizer components, for instance, chlorides such as potassium chloride and ammonium chloride, sulfates such as ammonium sulfate and potassium sulfate, magnesium, urea and so forth, are mixed with the abovesaid phosphate gel-sol mixture to granulate and harden it through utilization of its self-condensing, hardening and granulating properties, thereby to obtain a complex fertilizer having required fertilizer components contained in the inorganic compounds, the added phosphoric acid and the supplementary fertilizer components. According to this method, the thermal energy necessary for fabrication is sufficient only to promote the granulation and hardening. Since the potassium chloride and ammonium chloirde used as the fertilizer components are inexpensive, low-priced fertilizers can be supplied. Further, the fertilizer components in the inorganic compound minerals and the supplementary fertilizer component such as potassium chloride are included in the gel or sol of phosphate or the like and held in the granules. Besides, hardenability of the granules of the fertilizer fabricated through utilization of the gel-sol mixture is far better than in the case of a fertilizer produced by a conventional compound fertilizer manufacturing method called a mixing method in which prepared sulfate, chloride and phosphate are chemically treated while being mixed together and the mixture is granulated through using an adhesive binder, or by a method called a direct manufacturing method in which sufuric acid and phosphoric acid are combined while being neutralized with urea, ammonia and so forth and the mixture is granulated through using a granulating material such as silicious earth or talc. In addition, the granules produced using the abovesaid gel or sol are less hydroscopic and less soluble than the granules of the fertilizers manufactured by the prior art methods. Accordingly, the fertilizer by the wet manufacturing method is slightly soluble and slow-working as compared with the conventional fertilizers. With the wet manufacturing method, it is therefore possible to offer a fertilizer which prevents the loss of fertilizer components due to effusion and hence is economical and, at the same time, permits lessening the number of fertilizations and the labor therefor and which is less likely to incur water pollution and concentration trouble. The wet manufacturing method is highly advantageous in that it does not necessitate the use of a granulating material for granulation nor does it call for complex equipment such as a multi-stage neutralization reactor and a cooler for the removal of heat of neutralization and energies for operating them unlike the manufacture of the fertilizer consisting principally of phosphoric acid and ammonia according to the aforementioned direct method.

On the other hand, however, the wet manufacturing method employs inexpensive but water-soluble chloride and sulfate from the viewpoint of lowering the cost of fertilizer. Therefore, the fertilizer by this method contains sulfuric acid and chlorine radicals in large quantities as is the case with the fertilizer by the aforesaid mixing method using similar fertilizer components, and it has a serious harmful effect of promoting the deterioration of soil by its acidification resulting from dissolution of the sulfuric acid radical and the chlorine radical. Accordingly, the fertilizer by the wet manufacturing method is inferior in this point to the phosphoric acid-ammonia system fertilizer by the direct manufacturing method and fails to meet the requirements of a good fertilizer.

SUMMARY OF THE INVENTION

It is an object of the present invention to provide a compound fertilizer wich has substantially no such injurious action by the chlorine radicals as referred to above and utilizes unused resources.

According to the present invention, inexpensive chlorides such as potassium chloride, ammonium chloride and so forth are used as supplementary fertilizer components to be admixed with a phosphate or silicophosphate gel-sol mixture prepared by mixing phosphoric acid with the aforementioned inorganic compound minerals consisting principally of iron, aluminum, magnesium and others. Moreover, during granulation and hrdening, resultant combined chlorine is separated and recovered in the form of hydrochloric acid to minimize the chlorine radical content, thereby permitting not only the manufacture of a fertilizer with practically no bad effect on soil but also the making of hydrochloric acid.

The present invention can be further improved with an eye on the fact that a phosphoric acid raw material, for example, super phosphoric acid, condensed phosphoric acid or condensed phosphate, is far smaller in volume and richer in chemical activation energy than a phosphoric acid mixed solution. When such a phosphoric acid raw material is used for phosphorization of the inorganic compound mineral matter, it can easily be carried out and heat is vigorously generated by hydrolysis to promote the phosphorization of the inorganic compound mineral matter, reducing the reaction time. Further, the heat of phosphorization reaction thus vigorously generated compensates for a temperature drop resulting from heat absorption by mixed chlorides to maintain the temperature of the gel-sol mixture, and greatly affects its self solidification and aging, leading to a marked saving of heat energy.

The present invention is moreover modified so as to be characterized in that the manufacture of the compound fertilizer using the phosphate and silicophosphate gel-sol mixture formed by the aforesaid inorganic compound mineral matter, an organic and the phosphoric acid solution includes a step in which a slow-working nitrogen fertilizer raw material, for example, urea, is admixed with the gel-sol mixture and the admixture is subjected to polycondensation through the use of an acetaldehyde system material which undergoes a polycondensation reaction with the mixture, thereby improving the difficulty soluble and slow working properties in a large quantity of water.

BRIEF DESCRIPTION OF THE DRAWINGS

The present invention will be described in detail below with reference to the accompanying drawings, in which.

DESCRIPTION OF THE PREFERRED EMBODIMENTS

Figure 1:
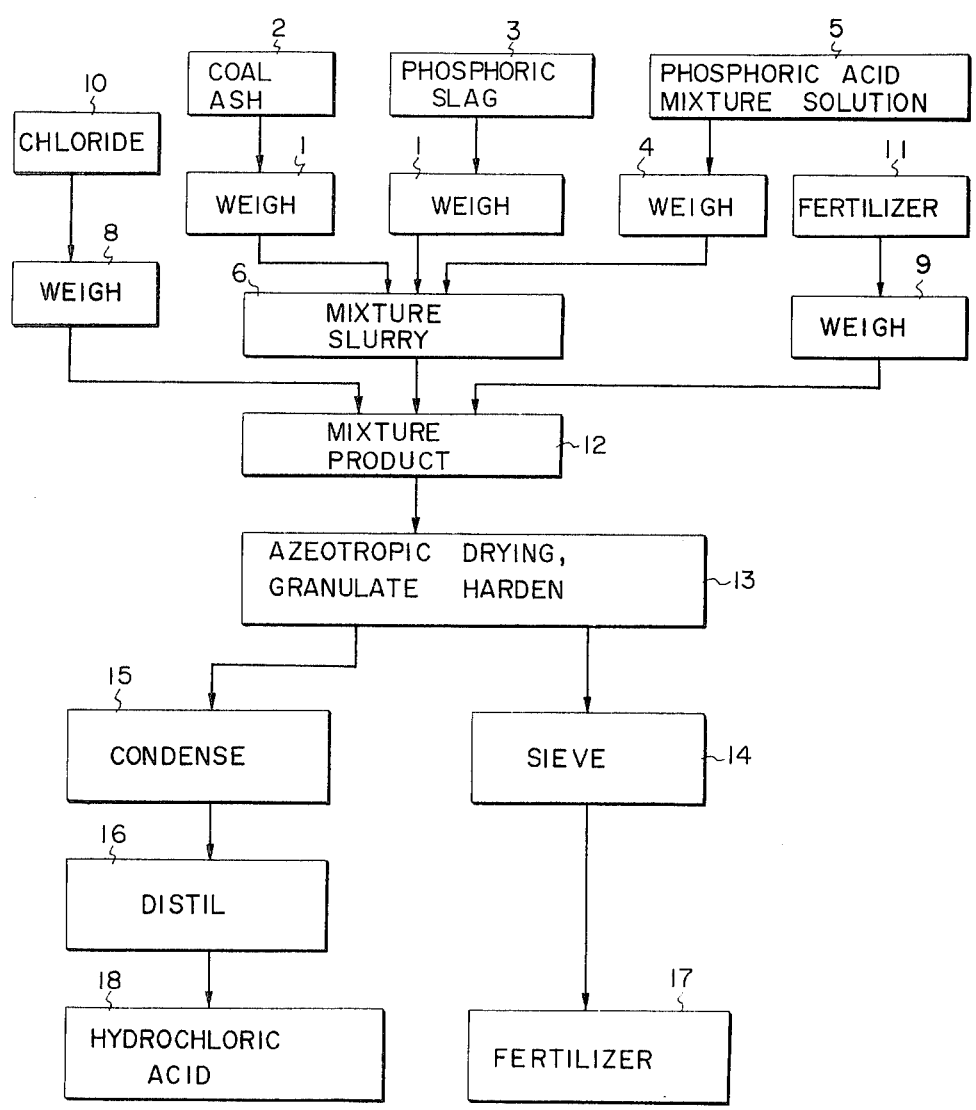
FIGS. 1, 2 and 3 are block diagrams explanatory of examples of the present invention.

As illustrated in FIG. 1 to explain of the fertilizer manufacturing process of the present invention, one or more kinds of weighed (1) inorganic compounds consisting principally of iron, aluminum, magnesium, silica and so on, for instance, coal ash (2) and phosphoric slag (3), are mixed with a weighed (4) phosphoric acid mixture solution (5) to form a mixture slurry (6), producing a phosphate or silico-phosphate gel-sol mixture and hydrogen. When the temperature of the mixture has risen due to reaction, to surround it by a reducing atmosphere, a weighed (8) chloride, for example, potassium chloride, and ammonium chloride or the like (10), and other weighed (9) necessary components (11) are mixed with the slurry, followed by stirring of the mixture. The mixture product (12) of the phosphate or silicophosphate gel-sol mixture, hydrochloric acid and hydrogen is granulated and hardened (13) while being heated for azeotropic drying, and then the granules are sieved (14). Moreover, hydrochloric acid and water evaporated at this time are condensed (15) and then distilled (16), thus obtaining a gel compound fertilizer (17) along with hydrochloric acid (18).

With such a method, since combined chlorine of the added and mixed chloride is separated and recovered in the form of hydrochloric acid, it is possible to reduce the content of the chlorine radical which is undesirable in the fertilizer in large quantities. Further, since nitrogen salt and potassium salt are included and held in the phosphate or silicophosphate gel-sol mixture, the effusion rate of these salts is made low, resulting in the fertilizer becoming difficultly soluble and slow-working. Therefore, according to the present invention, a compound fertilizer which fulfills the requirements, such as low acidification of soil and small loss of fertilizer components due to effusion, can be obtained through utilization of artificial or natural untouched resources. Moreover, the present invention makes effective use of industrial waste and does not involve the use of complex and bulky equipment and power therefor, and hence allows easy production of hydrochloric acid as well as a compound fertilizer at a low cost. Next, the present invention will be described with respect to its specific examples.

EXAMPLE I

Manufacture of nitrogen-phosphoric compound fertilizer and hydrochloric acid

The following materials:

| | |
|---|---|
| Coal ash | 410 kg |
| Phosphoric acid 40% mixed solution | 520 kg |
| Ammonium chloride | 575 kg |
| Magnesium hydroxide | 5 kg | were used, and fertilizer and hydrochloric acid were produced concurrently by the manufacturing steps and operations described below.

The phosphoric acid solution is added to and mixed with the coal ash to obtain a slurry. By the resulting heat generating reaction, a phosphate or silicophosphate gel-sol mixture and hydrogen begin to form. Then, when the product has sufficiently been covered with a reducing atmosphere of the hydrogen, the ammonium chloride is added to and mixed with the product, and combined chlorine is separated as hydrochloric acid. At this time, a temperature decrease caused by heat absorption and dissolution of the ammonium chloride retards its reduction and the hydrochloric acid forming reaction. So it is preferable to prevent lowering of the reaction temperature through the use of regenerative ammonium chloride or by preheating. When the reaction has sufficiently proceeded, the magnesium hydroxide is added to the abovesaid gel or sol to increase its magnesium content and the amount of magnesium chloride added is adjusted so that the mixture may have a desired pH value. Thereafter, the thus generated phosphate or silicophosphate gel-sol mixture is heated through a rotary-drum-like drier. In a case where water produced concurrently with the hydrochloric acid or the water content and the phosphoric acid mixture solution are insufficient, they are supplied. Then, the mixture is subjected to azeotropy, by which hydrochloric acid evaporated together with water is condensed for recovery and, at the same time, the gel-sol mixture is granulated and dried, thus obtaining a nitrogen-phosphoric fertilizer of a small chlorine radical content. The yield of hydrochloric acid (HCl 100%) in this case was about 130 kg and the yield of the fertilizer was approximately 1,000 kg.

EXAMPLE II

Manufacture of potassium phosphate compound and hydrochloric acid

The following materials:

| | |
|---|---|
| Coal ash | 350 kg |
| Phosphoric slag | 300 kg |
| Phosphoric acid mixture solution (40% phosphoric acid) | 520 kg |
| Potassium chloride | 239 kg | were used and, a potassium phosphate fertilizer and hydrochloric acid were produced concurrently by the same manufacturing steps and operations as those employed in Example I. The yields of hydrochloric acid (HCl 100%) and fertilizer were about 37 kg and about 1,000 kg, respectively.

EXAMPLE III

Manufacture of nitrogen-potassium phosphate compound fertilizer and hydrochloric acid

| | |
|---|---|
| Coal ash | 200 kg |
| Potash fedspar | 150 kg |
| Phosphoric acid mixture solution (40% phosphoric acid) | 520 kg |
| Ammonium chloride | 580 kg | were used, and a nitrogen-potassium phosphate compound fertilizer of small chlorine radical content and hydrochloric acid were produced concurrently by the same manufacturing steps and operations as those employed in Example I. The yields of hydrochloric acid and fertilizer were approximately 80 kg and about 1,000 kg, respectively.

The above is a description of the present invention given in connection with its specific examples. In the above, it is also possible, for instance, that a portion of the phosphoric acid solution to be added to the inorganic compound is added together with the chloride so that the temperature drop of the gel-sol mixture resulting from heat absorption by the chloride may be reduced by the heat generating reaction which is caused by the addition of the phosphoric acid solution. Further, the phosphoric acid mixture solution used need not be a concentrated one and the amount of water, which is supplied during heating for drying the produced phosphate or silicophosphate gel-sol mixture as described previously, is determined according to the water content of the phosphoric acid mixture solution. Moreover, in order to provide the fertilizer with the sulfuric acid radical which has a useful effect on the drops when contained in a suitable quantity, in contrast to the chlorine radical which is harmful and useless to the crops, an appropriate quantity of sulfuric acid may also be added when mixing the phosphoric acid mixture solution with the inorganic compound. The addition of sulfuric acid facilitates the interaction of the inorganic compound and the phosphoric acid mixture solution as well. For promoting their interaction, nitric acid may also be added.

However, the above mentioned method is defective in that the phosphoric acid mixed solution of low concentration for the formation of the phosphate and silicophosphate gel-sol mixture is large in volume, and hence is inconvenient to carry out. Moreover, this method has such disadvantages that since the phosphoric acid mixed solution is small in chemical activation energy, the reaction for the formation of the gel-sol mixture takes much time, and makes the manufacture time-consuming, and that heat energy, though lower than in the case of the conventional firing method, is still needed for drying and hardening.

In accordance with the present invention, the above mentioned method can be improved as a compound fertilizer manufacturing method which is free from such defects as referred to above.

Figure 2:
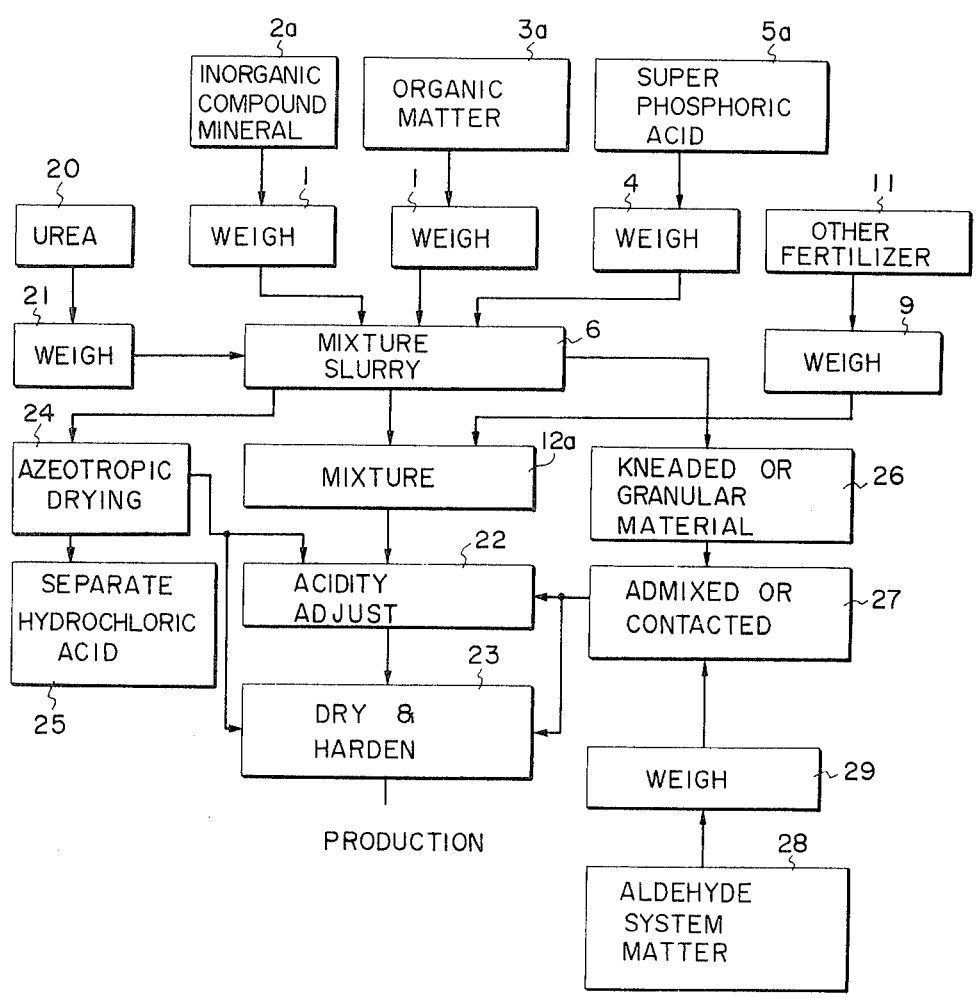

With reference to FIG. 2, another example of the invention will hereinafter be described in detail.

As illustrated, inorganic compound mineral matter (1), organic matter (3a) and super phosphoric acid (5a), which are raw materials, are respectively weighed (1), (1) and (4) and then fed into a mixer-reactor, wherein they are mixed together to develop a phosphorization reaction by the super phosphoric acid (5a) to obtain a slurry (6). When the generation of hydrogen has begun, chlorides and other supplementary fertilizer components (11) are weighed (9) and homogeneously mixed (12a) with the slurry, after which the acidity of the mixture is adjusted (22) as required. Then the mixture is supplied to a drying, granulating, reacting and aging device in which the mixture is granulated and hardened (23) through utilization of the heat of phosphorization reaction.

Incidentally, a phosphate-silicophosphate gel-sol mixture formed by mixing the chlorides in the mixture slurried (6) by the mixer-reactor contains hydrochloric acid and yields a fertilizer having a large chlorine radical content. However, by adding a step in which a mixture product of the phosphate-silicophosphate gel-sol mixture, hydrochloric acid and hydrogen is subjected to azeotropic drying (24) to separate the hydrochloric acid (25) and by granulating and hardening (23) the mixture product in the drying, granulating reacting and aging device, a fertilizer with little chlorine radical content can be obtained. Further, by adding a step in which urea (20) is weighed (21) and homogeneously mixed with the product (6) having removed therefrom the hydrochloric acid or having not separated it therefrom to produce a kneaded or granular material (26) and, for instance an aldehyde system material (28) which undergoes polycondensation reaction with the urea is weighed (29) and admixed or contacted (27) in the form of a liquid or gas with the kneaded or granular material, and by granulating and hardening (23) the mixture in the drying, granulating, reacting and aging device, the difficultly soluble and slow-working properties due to the chemical stability by the urea polycondensation product are combined with the difficultly soluble and slow-working properties due to the physical function by the self solidification of the gel-sol mixture, and it is possible to produce a fertilizer which exhibits a high degree of slow-workability in a large quantity of water as in a paddy rice field. Next, the present invention will be described concretely in respect of its examples.

EXAMPLE IV

The following material were used:

| | |
|---|---|
| Coal ash | 307 kg |
| Phosphoric anhydride | 102 kg |
| Potassium chloride | 142 kg |
| Organic liquid (alcohol waste solution) | 312 kg |
| Urea | 217 kg |
| Acetaldehyde | 100 kg | and the following manufacturing steps and operations were used. A yield of 1000 kg was obtained.

The alcohol waste solution and the potassium chloride and the phosphoric anhydride are admixed with the coal ash. The phosphoric anhydride forms phosphoric acid while hydrolyzing and, at the same time, it phosphorizes organic matter in the alcohol waste solution, generating heat and forming a gel-sol mixture consisting principally of phosphate and silicophosphate. Thereafter, the gel-sol mixture is allowed to stand or is stirred for a suitable period of time and the urea is added to and mixed with the mixture before or after its self solidification begins. Then, the acetaldehyde is admixed with the mixture to form a urea polycondensation product, after which it is dried, granulated and gardened.

The acetaldehyde may be used in the form of a liquid as in the above, but if it is used in a gaseous form and contacted with the granules, the urea on the surface of the fertilizer granulate is subjected to polycondensation. The acetaldehyde may be replaced by crotonaldehyde.

EXAMPLE V

| | |
|---|---|
| Mixture of coal ash and slag | 307 kg |
| Organic matter (mashed fish and shell) | 322 kg |
| Potassium sulfate | 144 kg |
| Condensed phosphoric acid | 115 kg |
| Urea | 217 kg |
| Isobutyl aldehyde | 100 kg |

The condensed phosphoric acid is mixed with the organic matter to dehydrate and phosphorize the organic matter, with which the mixture of coal ash and slag is admixed to form a gel-sol mixture of phosphate, silicophosphate and the organic matter. Then, the potassium salt and the urea are added to and homogeneously mixed with the mixture, and the isobutyl aldehyde is admixed with the mixture. As a result of this, the urea and phosphoric acid become difficultly soluble, and are hardened by a polycondensation product to seal therein a water-soluble matter such as the potassium salt and the like; thus the effusion rate of the urea and phosphoric acid can be decreased. In the case of fibrous wooden organic matter, if it is treated with phosphoric acid or alkali, fertilization can be promoted.

The above-mentioned wet manufacturing method has great advantages in terms of manufacture such that it does not necessitate the use of a granulating material for granulation nor does it call for a bulky and complex-structured equipment such as a multistage neutralization reactor and a cooler for the removal of heat of neutralization and power and running costs thereof unlike in the manufacture of the fertilizer consisting principally of phosphoric acid and ammonia according to the aforementioned direct method. As a result of studies made afterward, however, it has been clarified that this fertilizer has the following shortcoming when put in a large quantity of water, for instance, in a paddy rice field. That is to say, the studies have revealed that the granulated compound fertilizer using inorganic compound mineral matter and the phosphoric acid mixed solution has a defect such that, when the content of the chlorides, such as potassium chloride and ammonium chloride, and water-soluble salts, such as urea and so on, are large, solid bodies of the phosphate or silicophosphate gel-sol mixture becomes crumbly through dispersion of the hydroscopic and water-soluble potassium chloride, ammonium chloride and urea in the large quantity of water, resulting in the sparingly soluble and slow-working properties being markedly impaired.

In accordance with the present invention, the above example can be modified so as to provide a compound fertilizer which has solved such a defect as described above and which utilizes inorganic compound mineral matter difficult to crumble in water and a slow-working nitrogen fertilizer material.

The modified example of the invention will hereinafter be described in detail with reference to the accompanying drawing.

Figure 3:
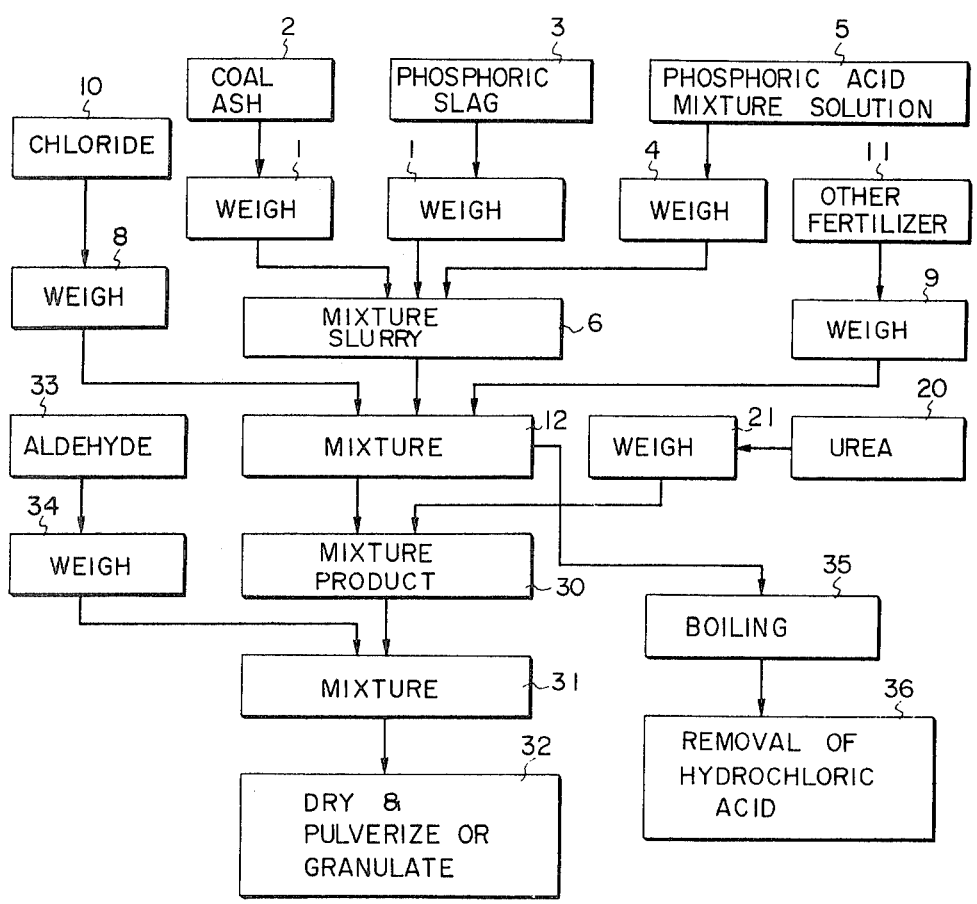

As illusrtrated in FIG. 3, to explain the of manufacturing steps, one or more kinds of weighed (1) inorganic compound mineral matter consisting principally of iron, aluminium, magnesium, silica and so forth, for instance, coal ash (2) and phosphoric slag (3), and a weighed (4) phosphoric acid mixed solution (5) are mixed into a slurry (6). Then weighed (8) chlorides (10), for instance, potassium chloride and ammonium chloride, and weighed (9) other required fertilizer components (11) are mixed (12) with the slurry and stirred, and weighed (21) urea (20) is homogeneously admixed with the resulting mixture product (30). Acetaldehyde system material, for example, isobutyl aldehyde, acetaldehyde and the like (33) are weighed (34) and then mixed with an admixture (31) to cause it to undergo a polycondensation reaction. Thereafter, the mixture is dried and pulverized or granulated (32).

According to this method, the fertilizer components which readily disperse, such as potassium chloride, are sealed, hardened and granulated by virtue of the self-solidifying properties of the phosphate and silicophosphate gel-sol mixture and the urea polycondensation product. In other words, according to the present invention, the difficultly soluble and slow-working performances, due to the physical properties of the phosphate and silicophosphate gel-sol mixture are combined with the difficultly soluble and slow-working properties based on the chemical stability by the compound of phosphate of silicophosphate and urea. Therefore, according to the present invention, the compound fertilizer utilizing such unused inorganic compound minerals as coal ash and various slag can be made very difficultly soluble and slow-working; namely, effusion of potassium chloride in a large quantity of water can be suppressed, thus permitting improvement in the fertilizer absorption rate, saving of fertilizer owing to reduction of its effusion loss and saving of the labor for fertilization.

Furthermore, according to the present invention, a compound fertilizer with little chlorine radical content, described with reference to FIG. 1, can be made very slow-working. That is, also in the case of a fertilizer produced by such a method in which a phosphoric acid solution is mixed with inorganic compound minerals to develop a heat generating reaction and when such chlorides as potassium chloride and other fertilizer components are added to the mixture to form the phosphate and silicophosphate sol-gel mixture, hydrochloric acid formed simultaneously with the gel-sol mixture is separated and recovered by boiling (35) together with water as shown in FIG. 3 to thereby reduce chlorine radicals, the fertilizer can be made very diffcultly soluble and slow-working by adding urea after removal (36) of the hydrochloric acid and then contacting an aldehyde system material with the mixture.

Next, the present invention will be described specifically in connection with its examples.

Example VI

The following materials are used:

| Coal ash | 440 kg |
| --- | --- |
| Phosphoric acid 40% mixed solution | 345 kg |
| Potassium chloride | 158 kg |
| Urea | 214 kg |
| Isobutyl aldehyde | 110 kg | and fertilizer was produced by the following manufacturing steps and operations; a yield was about 1000 kg.

The coal ash and the phosphoric acid mixed solution are mixed into a slurry. Next, the potassium chloride is mixed in the slurry when a heat generating reaction for forming a phosphate and silicophosphate gel-sol mixture and hydrogen. At this time, since the slurry temperature is lowered by dissolution of the potassium chloride, it is preferred to use temperature maintaining or heating means. Then, the combined chlorine of the potassium chloride is separated by phosphoric acid and hydrogen to form hydrochloric acid, which can be separated by supplying a suitable quantity of water and heating to boiling together with the water. Further, since the formed phosphate and silicophophate gel-sol mixture becomes strongly acidic according to the quantity of the formed hydrochloric acid contained therein, it is preferable to adjust, as required, the acidity of the gel-sol mixture through using a fertilizing alkali, for example, caustic potash, magnesium hydroxide, calcium or the like. Thereafter, the urea is homogeneously admixed with the gel-sol mixture and the isobutyl aldehyde mixed and contacted with the gel-sol mixture to neutralize it. Finally, the mixture is dried and pulverized, or granulated, dried and adjusted in grain size.

EXAMPLE VII

The following materials were used:

| Coal ash | 214 kg |
| --- | --- |
| Sludge from phosphorus making | 200 kg |
| Phosphoric acid 40% mixed solution | 345 kg |
| Potassium chloride | 79 kg |
| Potassium sulfide | 93 kg |
| Urea | 214 kg |
| Acetaldehyde | 100 kg | and fertilizer was produced by the following manufacturing steps; a yield was about 1000 kg.

The phosphoric acid mixed solution is mixed with the coal ash and the sludge to form a phosphate and silicophosphate gel-sol mixture. Before or after the mixture starts its self solidification the potassium chloride is homogeneously mixed with the mixture. At this time, the acidity of the mixture is adjusted, as required, by using or a fertilizing alkali component, after which the urea is homogeneously admixed with the phosphate and silicophosphate gel-sol mixture and then the acetaldehyde is admixed therewith. Next, the urea and the acetaldehyde are contacted with each other to form a urea-acetaldehyde condensation product (CDU), which is dried and granulated.

EXAMPLE VIII

The same raw materials as in Example VII are used. A phosphate and silicophosphate gel-sol mixture paste homogeneously mixed with the urea is suitably dried and granulated. Then, the granules are placed in a reaction oven, in which acetaldehyde is contacted in a gaseous form with the granules to form thereon a film of a urea-acetaldehyde condensation product, producing a coated compound fertilizer. Since the condensation product formed on the granule surface is alkaline and stable, it is possible with this method to fabricate an alkaline compound fertilizer and other fertilizers containing oxamide, which can be suitably decomposed and absorbed in soil.

As will be evident from the foregoing description, the present invention enables the manufacture of a compound fertilizer of unused inorganic compound minerals which is very difficulty soluble, slow-working and hence is almost free from effusion loss in a large quantity of water; accordingly the present invention is of great utility in practical use.

What we claim is:

1. A compound fertilizer with a low chlorine radical content, which is produced by the steps of: mixing a phosphoric acid solution with inorganic compound material matter consisting principally of iron, aluminum, magnesium, calcium and silica and others to form a slurry and produce a phosphate or silicophosphate gel-sol mixture and hydrogen, admixing a chloride fertilizer component with the slurry to obtain a mixture of the phosphate or silicophosphate gel-sol mixture, hydrochloric acid and hydrogen, and heating and drying the resulting product mixture to separate therefrom hydrochloric acid and to obtain a solid-solution hardened compound fertilizer of low chlorine radical content.

2. The compound fertilizer of claim 1 which is difficultly soluble and slow-working due to the presence of the phosphate or silicophosphate gel-sol.

3. The compound fertilizer according to claim 1 which comprises a polycondensation agent.

4. The compound fertilizer according to claim 3 wherein said polycondensation agent is an aldehyde.

5. A method for the simultaneous manufacture of a compound fertilizer with a low chlorine radical content and of hydrochloric acid, comprising the steps of: mixing a phosphoric acid solution with inorganic compound mineral matter consisting principally of iron, aluminum, magnesium, calcium and silica to form a slurry and produce a phosphate or silicophosphate gel-sol mixture and generate hydrogen; admixing chloride fertilizer components with the slurry to obtain a mixture of the phosphate or silicophosphate gel-sol mixture, hydrochloric acid and hydrogen; and drying the resulting product mixture by heating, to produce a solid-solution hardened compound fertilizer and hydrochloric acid at the same time.

6. The method for the manufacture of a compound fertilizer according to claim 5, in which concentrated phosphoric acid, selected from super phosphoric acid, condensed phosphoric acid, or concentrated phosphate is used as the phosphoric acid raw material.

7. The method according to claim 5 which comprises the adaditional step of adding a polycondensation agent to said gel-sol mixture.

8. The method according to claim 7 wherein the polycondensation agent is an aldehyde.

9. The process according to claim 5 wherein the chloride and other fertilizer components are mixed with said slurry when the slurry is surrounded by a reducing atmosphere.

10. A fertilizer of low solubility which is produced by the steps of: forming a phosphate and silicophosphate gel-sol mixture by slurrying a phosphoric acid solution with inorganic compound mineral matter consisting principally of iron, aluminum, calcium, magnesium and silica; mixing chlorides including a potassium salt and a nitrogen salt with said gel-sol mixture; mixing a fertilizer raw material of low solubility with the gel-sol mixture, and and kneading or granulating the gel-sol mixture to produce a nitrogen fertilizer of low solubility.

11. The fertilizer of low-solubility according to claim 10 which is produced by the additional step of removing hydrochloric acid from the gel-sol mixture after mixing the chlorides therewith to provide a nitrogen fertilizer of low chlorine radical content.

12. The fertilizer of low solubility according to claim 10 which is produced by the additional step of adding a polycondensation agent to said gel-sol mixture.

13. The fertilizer according to claim 12 wherein said polycondensation agent is an aldehyde.

14. A method for the manufacture of a compound fertilizer of low solubility comprising steps of: forming a phosphate and silicophosphate gel-sol mixture by slurrying a phosphoric acid solution with inorganic compound material mineral matter consisting principally of iron, aluminum, magnesium calcium and silica, mixing chlorides including a potassium salt and a nitrogen salt with said gel-sol mixture; mixing a fertilizer raw material of low solubility with the gel-sol mixture; and kneading or granulating the gel-sol mixture to thereby produce a nitrogen fertilizer of low solubility.

15. The method according to claim 14 comprising the additional step of adding a polycondensation agent to said gel-sol mixture.

16. The method according to calim 15 wherein the polycondensation agent is an aldehyde.

17. The method according to claim 15 wherein the fertilizer components which readily disperse including potassium chloride are sealed, hardened and granulated as a result of the self-solidifying properties of the phosphate and silicophosphate gel-sol mixture and the polycondensation product of the polycondensation agent.

18. The method according to claim 14 comprising the additional steps of removing hydrochloric acid from the gel-sol mixture after mixing the chlorides therewith to provide a nitrogen fertilizer of low chlorine radical content.

19. The method according to claim 14 comprising the additional steps of removing hydrochloric acid from the gel-sol mixture after mixing the chlorides therewith and adding urea to the gel-sol mixture after removal of hydrochloric acid.

* * * * *